(12) United States Patent
Shirane

(10) Patent No.: US 6,337,779 B1
(45) Date of Patent: Jan. 8, 2002

(54) DISC-LIKE RECORDING MEDIUM, DISC DRIVE, AND METHOD FOR READING DISC-LIKE RECORDING MEDIUM

(75) Inventor: Kyoichi Shirane, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/295,904

(22) Filed: Apr. 21, 1999

Related U.S. Application Data

(63) Continuation of application No. PCT/JP98/03865, filed on Aug. 28, 1998.

(30) Foreign Application Priority Data

Aug. 28, 1997 (JP) .............................................. 9-232766

(51) Int. Cl.[7] .............................................. G11B 15/18
(52) U.S. Cl. ........................ 360/69; 360/48; 360/77.08
(58) Field of Search ............................ 360/77.08, 78.07, 360/75, 69, 48

(56) References Cited

U.S. PATENT DOCUMENTS

| | | | | |
|---|---|---|---|---|
| 4,001,883 A | * | 1/1977 | Strout et al. .................... | 360/48 |
| 4,389,681 A | * | 6/1983 | Tanaka et al. .................. | 360/27 |
| 4,494,156 A | * | 1/1985 | Kadison et al. ................ | 360/48 |
| 5,553,086 A | * | 9/1996 | Sompel et al. ............... | 714/798 |
| 5,609,810 A | * | 3/1997 | Fujiwara et al. .............. | 264/219 |
| 5,708,650 A | * | 1/1998 | Nakashima et al. ...... | 369/275.3 |
| 5,917,669 A | * | 6/1999 | Johnson et al. ................ | 360/53 |
| 5,926,333 A | * | 7/1999 | Bang ............................ | 360/51 |
| 5,956,205 A | * | 9/1999 | Konno et al. ............ | 360/99.02 |
| 6,108,156 A | * | 8/2000 | Lee et al. ....................... | 360/75 |
| 6,122,142 A | * | 9/2000 | Kabasawa ................ | 360/99.06 |

\* cited by examiner

Primary Examiner—David Hudspeth
Assistant Examiner—Dan I. Davidson
(74) Attorney, Agent, or Firm—Oblon, Spivak, McClelland, Maier & Neustadt, P.C.

(57) ABSTRACT

In a servo area $S_A$ on a track that is empty of data and that lies outside a user data read/write area, to and from which a user data of a floppy disc is written and read, format information FI of the floppy disc is recorded. The format information FI is recorded along with a track number TN in a gray code area $G_A$ in the servo area $S_A$. Thereby, the format of the floppy disc can be identified with no identification hole or the like formed in an envelope encasing the floppy disc.

20 Claims, 11 Drawing Sheets

| bit | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| | f | f | f | f | f | f | f | x | x | x | x | x | x | x | x | x | x | x | x |
| | MSB | | | | | (Frame No.) | | LSB | MSB | | | | | (Track No.) | | | | | LSB |

FIG.6

| bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| | i | i | i | i | i | f | f | f | f | f | f | f | x | x | x | x | x | x | x | x | x | x | x | x |
| | (information bit) | | | | | MSB — (Frame No.) — LSB | | | | | | | MSB — (Track No.) — LSB | | | | | | | | | | | |

FIG.11

DISC-LIKE RECORDING MEDIUM, DISC DRIVE, AND METHOD FOR READING DISC-LIKE RECORDING MEDIUM

This application is a continuation of international application number PCT JP/98/03865, filed Aug. 28, 1998, now pending.

TECHNICAL FIELD

The present invention relates to a disc-like recording medium such as floppy disc, a disc drive and a method of reading information signal recorded in the disc-like recording medium.

BACKGROUND ART

Recently, increasingly more attention has been paid to an increased density recording of information in a removable disc-like recording medium such as floppy disc and the like. To this end, a large capacity floppy disc of several tens megabytes, for example, has been proposed.

If the removable disc-like recording medium of this type is changed in format in a same form as in the existing recording medium or a next generation standard is proposed for the recording medium, a recording apparatus and reproducing apparatus have to identify the format of the medium and a standard applied therein. Generally, for the format and standard identification, an identification hole or the like, for example, is provided in the envelope encasing the disc-like recording medium.

However, floppy discs as a typical example of the above-mentioned removable recording medium already include some versions and many types of large capacity floppy discs will be proposed as next generation floppy discs to support a future high density recording. Therefore, to identify floppy discs of a next generation and a further generation, corresponding identification holes or cuts have to be formed in the envelopes of the respective floppy discs.

Practically, however, so many identification holes or cuts as the kinds of floppy discs could not unlimitedly be formed in the floppy disc envelopes. Also, recording/reproducing apparatus could not be provided with detectors to identify the identification holes or cuts formed in the floppy disc envelope for identification of such holes or cuts in the floppy disc envelope.

DISCLOSURE OF THE INVENTION

Accordingly, the present invention has an object to overcome the drawbacks of the prior art by providing a disc-like recording medium, a disc drive and a method of reading the disc-like recording medium, adapted to identify the write format and the like provided on the medium without the necessity of any extra identification holes or cuts formed in the envelope for the recording medium and additional detectors provided in the recording/reproducing apparatus as well as with only a minimum necessary increase of the load to the hardware.

The above object can be achieved by providing a disc-like recording medium with a plurality of substantially circumferential tracks, having formed thereon a plurality of servo areas in which tracking servo information is recorded and a plurality of data areas, the servo and data areas being disposed alternately in each of the tracks, one servo area in each track and a data area following the servo area forming together one servo frame, an format information being recorded along with the servo information in the servo area.

The plurality of tracks includes a plurality of user data tracks and an empty track formed along at least either of the outermost and innermost circumferences of the disc-like recording medium, the format information being recorded in the servo area on the empty track.

The above object can also be achieved by providing a disc drive adapted to drive and read a disc-like recording medium with a plurality of substantially circumferential tracks, having formed thereon a plurality of servo areas in which tracking servo information is recorded and a plurality of data areas, the servo and data areas being disposed alternately in each of the tracks, one servo area in each track and a data area following the servo area forming together one servo frame, an format information being recorded along with the servo information in the servo area, comprising:

a head to read information recorded in the disc-like recording medium;

means for moving the read head radially of the disc-like recording medium;

means for generating a tracking servo signal based on an output of the read head; and means for controlling the read head to read the servo information from any one of the servo areas, the moving means to seek the read head to the empty track, and the read head to read the format information of the empty track.

Further the above object can be achieved by providing a method of reading a disc-like recording medium with a plurality of substantially circumferential tracks, having formed thereon a plurality of servo areas in which tracking servo information is recorded and a plurality of data areas, the servo and data areas being disposed alternately in each of the tracks, one servo area in each track and a data area following the servo area forming together one servo frame, an format information being recorded along with the servo information in the servo area, comprising the steps of:

reading the servo information from any one of the servo areas;

allowing a read head to seek the empty track based on the read servo information; and reading the format information of the empty track.

BRIEF DESCRIPTION OF THE DRAWINGS

FIG. 6 shows an example of the manner in which servo frame numbers and track numbers are recorded in the gray code area in the servo area on the floppy disc in FIG. 1;

FIG. 11 shows an example of the form in which the format information, servo frame numbers and track numbers are recorded in the gray code area in the servo area in FIG. 10.

BEST MODE FOR CARRYING OUT THE INVENTION

These objects and other objects, features and advantages of the present intention will become more apparent from the following detailed description of the present invention when taken in conjunction with the accompanying drawings.

An embodiment of the removable disc-like recording medium according to the present invention is supposed here to be a 3.5 inch-type floppy disc (also called "flexible magnetic disc"). The floppy disc is a magnetic disc of 3.5 inches in diameter and having a large storage capacity of several tens megabytes, for example, and encased in an envelope. The shape and size of this floppy disc are same as those of an existing 2 MB-type floppy disc.

The floppy disc or flexible magnetic disc according to the present invention adopts a padded servo system in which servo control is done with each servo frame. The servo frame is formed from a servo area in which servo information, etc. are recorded and a data area in which user data is recorded. The floppy disc has recorded in the servo area a format information which informs a disc drive (so-called floppy disc drive: FDD) of differences in format, etc. of the floppy disc from other floppy discs. The format information is a parameter information indicative of a difference in format or version of the floppy disc in which the format information is recorded from other floppy discs.

Figure 1:
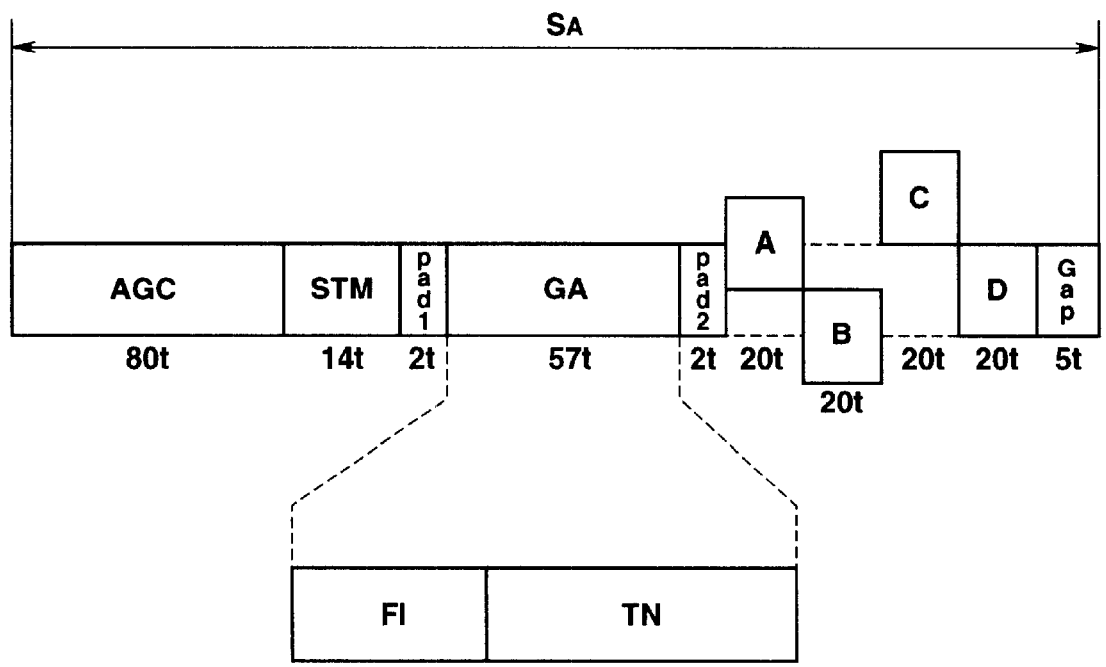
FIG. 1 shows an example of the servo area formed an embodiment of the floppy disc according to the present invention.
Figure 2:
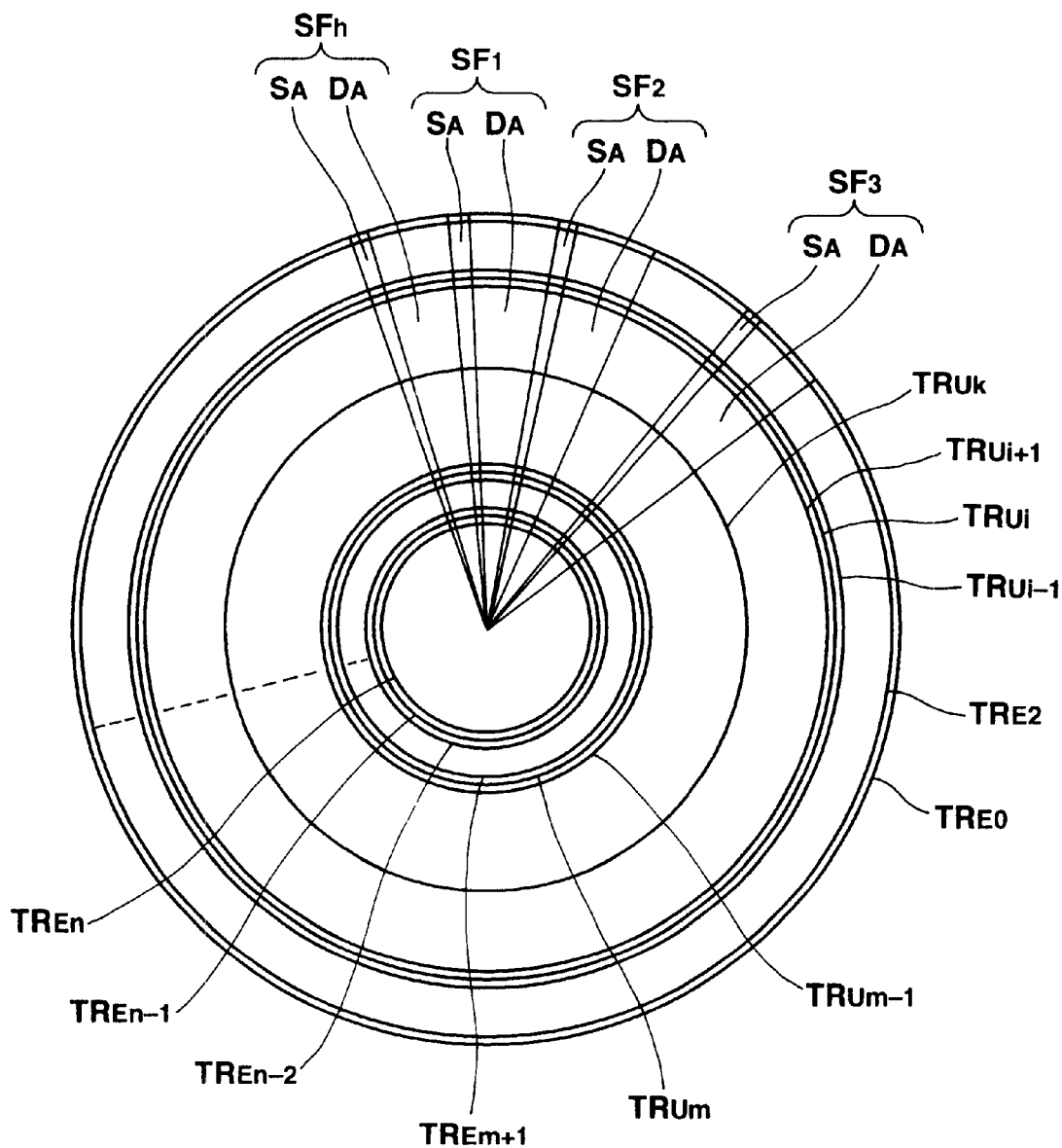
FIG. 2 shows positions of servo frames and track in the floppy disc in FIG. 1.
Figure 3:
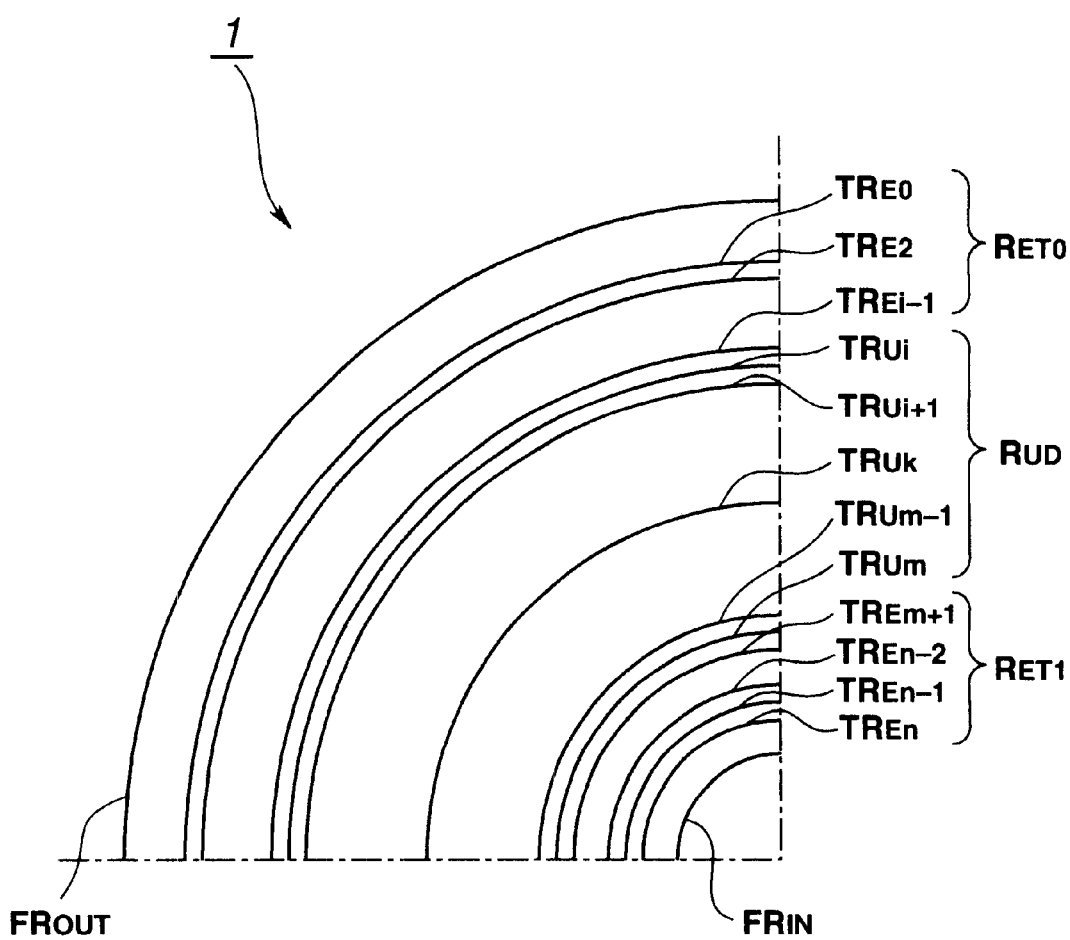
FIG. 3 shows a part of the floppy disc in FIG. 1, illustrating the geometry of tracks on the floppy disc.

Referring now to FIG. 1, there is illustrated an example of the servo area $S_A$ of the floppy disc being the embodiment of the present invention. The format information FI is recorded in a gray code area $G_A$ of the servo area $S_A$. FIGS. 2 and 3 schematically show the tracks, etc. formed on the floppy disc.

As shown in FIGS. 2 and 3, the floppy disc generally indicated with a reference 1 in FIG. 3 has a plurality of substantially circumferential tracks TR, a plurality of servo areas $S_A$ in which the tracking servo information is recorded and a plurality of data areas $D_A$. In each of the tracks TR, the servo areas $S_A$ and data areas $D_A$ are disposed alternately. One servo area $S_A$ in each track TR and a data area $D_A$ following the servo area $S_A$ form together one servo frame SF. As shown in FIG. 3, the floppy disc 1 has an outer edge $FR_{OUT}$ and inner edge $FR_{IN}$.

The above plurality of tracks TR include a plurality of user data tracks $TR_{Ui}, TR_{Ui+1}, \ldots, TR_{Uk}, TR_{Um-1}$ and $TR_{Um}$ and an empty track $TR_E$ formed along at least one of the innermost and outermost circumferences of the floppy disc 1 being the disc-like recording medium of the present invention. In an example shown in FIGS. 2 and 3, an empty track $TR_E$ and an empty track $R_{ETI}$ are formed along the outer and inner circumferences, respectively, outside a user data read/write area $R_{UD}$ in which the above plurality of user data tracks $TR_{Ui}, TR_{Ui+1}, \ldots, TR_{Uk}, \ldots, TR_{Um-1}$ and $TR_{Um}$ are formed, a number i of empty tracks $TR_{E0}, TR_{E1}, \ldots$ and $TR_{Ei-1}$ are formed in the outer-circumferential empty track area $R_{ETO}$, and a number (n–m) of empty tracks $TR_{Em+1}, \ldots, TR_{En-1}$ and $TR_{En}$ are formed in the inner-circumferential empty track area $R_{ETI}$.

In addition, the floppy disc 1 had formed thereon a plurality of, for example, a number h of servo frames $SF_1$, $SF_2, \ldots, SF_8$ and $SF_h$ circumferentially thereof as shown in FIG. 2. The number h is 96, for example.

Each of the servo frames $SF_1, SF_2, \ldots, SF_8$ and $SF_h$ includes a data area $D_A$ into and from which data can be recorded and reproduced by the user, and a servo area $S_A$. The user can record data into the servo frames of the user data tracks $TR_{Ui}, TR_{Ui+1}, \ldots, TR_{Uk}, \ldots, TR_{Um-1}$ and $TR_{Um}$ in the data area $D_A$ of the user data read/write area $R_{UD}$ in the data area $D_A$.

No data is recorded in a part, corresponding to the data area $D_A$ of the user data read/write area $R_{UD}$, of the empty tracks $TR_{E0}, TR_{E1}, \ldots$ and $TR_{Ei-1}, TR_{Em+1}, \ldots, TR_{En-1}$ and $TR_{En}$ of the outer-circumferential empty track $R_{ETO}$ and inner-circumferential empty track $R_{ETI}$, respectively, but data is recorded only in the servo area $S_A$ shown in FIG. 1.

Figure 4:
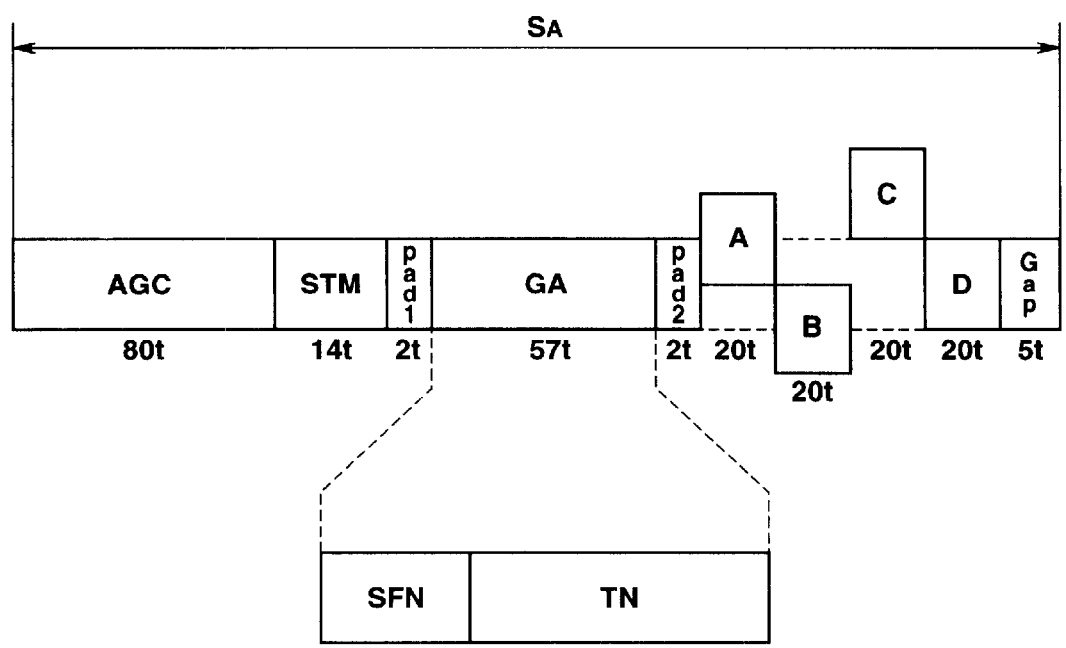
FIG. 4 shows an example of the servo area formed in the user data read/write area on the floppy disc in FIG. 1.

FIG. 4 shows an example of the servo area $S_A$ in the user data read/write area $R_{UD}$ shown in FIG. 3.

As seen from FIG. 4, the servo area $S_A$ has disposed therein an automatic gain control signal (will be referred to as "AGC signal" hereinunder), servo timing mark (will be referred to as "STM" hereinunder), Pad1, gray code area $G_A$, Pad2, burst patterns $BP_A$, $BP_B$, $BP_C$ and $BP_D$, and a gap area Gap. The length of each of these areas is represented by a number t of recorded signal bit clock periods or magnetization reversal intervals as will be described below. Then, the AGC signal has a length of 80t, STM has a length of 14t, Pad1 has a length of 2t, gray code area $G_A$ has a length of 57t, Pad2 has a length of 2t, burst patters $BP_A$, $BP_B$, $BP_C$ and $BP_D$ have length of 20t, respectively, and Gap has a length of 5t. The entire servo area $S_A$ has a length of 240t. When the bit clock frequency of a recorded signal is 10 MHz, for example, 1t=50 nsec and the time duration of the servo area $S_A$ is 12.0 μsec.

Figure 5:
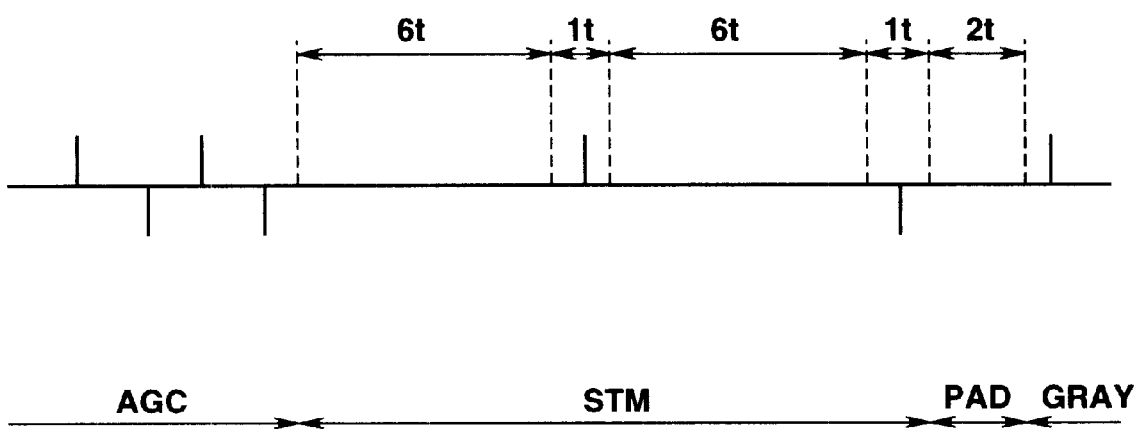
FIG. 5 shows an example of the pattern in which AGC signal and STM are recorded in the floppy disc in FIG. 1.

The AGC signal is recorded to control the disc drive to read signals at a predetermined level. For example, 40 waves of a signal having a frequency of 10 MHz and a duty of 50 are used for the AGC signal. The STM is used to detect the gray code, etc. and recorded in a pattern as shown in FIG. 5 along with a Pad1 having a space equivalent to a length of 2t.

As shown in FIG. 4, a servo frame number SFN and track number TN are recorded in the gray code area $G_A$ of the servo area $S_A$ in the user data read/write area $R_{UD}$. The track number TN and servo frame number SFN are a number or address to designate a plurality of tracks TR or a plurality of servo frames SF in each of the tracks TR as shown in FIGS. 2 and 3. The gray code area $G_A$ is normally an area in which a track number, etc. are recorded in a so-called gray code for a data to be reproducible even under an unstable or no tracking servo control.

As shown in FIG. 6, in the gray code area $G_A$ recorded in the user data read/write area, a track number TN is recorded in lower 12 bits and a servo frame number SFN is recorded in upper 7 bits, for example. The track number TN and servo frame number SFN are converted to a gray code and recorded through phase modulation. More particularly, each bit f of the servo frame number SFN is assigned to seven bits 18 to 12 counted from MSB and each bit x of the track number TN is assigned to twelve bits 11 to 0. The track number TN and servo frame number SFN are recorded in a total of 19 bits.

Figure 7:
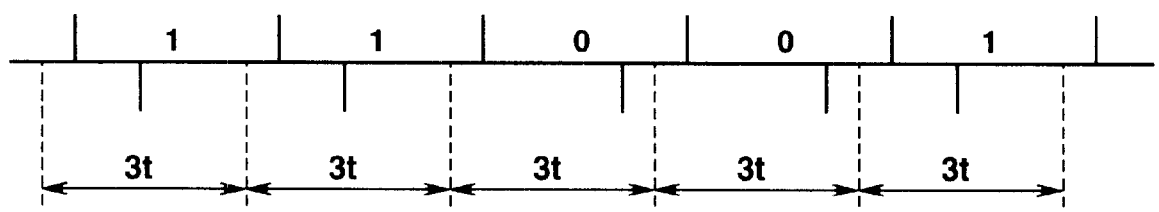
FIG. 7 shows an example of the pattern in which each information is recorded in the gray code area through phase modulation.

The phase modulation recording is such that as shown in FIG. 7, for example, a current magnetization is reversed to a positive one at every shift from one bit cell of 3t in width to a next bit cell, the magnetization is reversed to a negative one at a position of former 1t of a bit cell for a "1" bit, and to a negative one at a position of latter 2t of the bit cell for a "0" bit.

As described above, the servo area $S_A$ shown in FIG. 4 is of the user data track $TR_U$ in the user data read/write area $R_{UD}$ in FIG. 3, while that in FIG. 1 is of the servo area $S_A$ of the empty track $TR_E$ in the empty track area $R_{ETO}$ or $R_{ETI}$ shown in FIG. 3.

The servo area $S_A$ shown in FIG. 1 has disposed therein an AGC signal of 80t, STM of 14t, Pad1 of 2t, gray code area of 57t, Pad2 of 2t, burst pattern areas $BP_A$, $BP_B$, $BP_C$ and $BP_D$ each of 20, and Gap of 5t in this order. The gray code area $G_A$ has recorded therein the aforementioned format information FI and track number TN.

Note that in the magnetic disc according to the present invention, the servo area $S_A$ is configured to be readable so long as any other floppy disc different in data area configuration and modulation mode or linear density from the floppy disc 1 is interchangeable with the magnetic disc 1 for the purpose of reading the data recorded in the other floppy disc.

The format information FI includes parameter information such as floppy disc format, etc. as mentioned above. For example, the format information FI includes write format parameter information as shown in Table 1.

TABLE 1

| Location | Contents | Description |
| --- | --- | --- |
| 0–1 | EFF0h | ID flag (top) |
| 2–7 | 00h | Auxiliary (for ID of next generation floppy disc) |
| 8 | 00h | Header format |
| 9–10 | 0200h | Sector data length |
| 11 | 00h | Encoder/decoder mode |
| 12 | 00h | Scramble mode |
| 13 | 00h | ECC format mode |
| 14-N-2 | 00h | Auxiliary |
| N-1-N | EDEEh | ID flag (end) |

Note that the track number recorded in the empty track is provided for the disc drive to detect the current position of the read/write head even when the head is off the user data read/write area $R_{UD}$ during seeking operation. Namely, owing to the track number, the disc drive can also detect the head position in the empty track area $R_{ETO}$ or $R_{ETI}$ outside the user data read/write area $R_{UD}$.

Next, the burst patterns $BP_A$, $BP_B$, $BP_C$ and $BP_D$ for the tracking servo in the servo area $S_A$ shown in FIGS. 1 and 4 will be described herebelow.

The burst patterns $BP_A$, $BP_B$, $BP_C$ and $BP_D$ are pattern signals recorded each with a single frequency. Each of them is a single signal having a frequency of 10 MHz and duty of 50, for example.

The burst patterns $BP_A$, $BP_B$, $BP_C$ and $BP_D$ are formed to have a width $T_P$ (track pitch) along the center axis of the track. Of them, the C-phase burst pattern $BP_C$ is centered to the center axis of the odd track, for example, and the D-phase burst pattern $BP_D$ is centered to the center axis of the even track, for example. The A-phase burst pattern $BP_A$ and B-phase burst pattern $BP_B$ are formed at positions radially deviated by $T_P/2$ from the C-phase burst pattern $BP_C$ and D-phase burst pattern $BP_D$, respectively.

The burst patterns $BP_A$, $BP_B$, $BP_C$ and $BP_D$ are formed at positions deviated by $T_P/2$ from each other within a radial range of $2T_P$. Thus, on the supposition that $2T_P=360°$, the burst patterns $BP_A$, $BP_B$, $BP_C$ and $BP_D$ are in the phases of $0°$, $180°$, $90°$ and $-90°$, respectively.

When servo signals $U_A$, $U_B$, $U_C$ and $U_D$, for example, are obtained from the burst patterns $BP_A$, $BP_B$, $BP_C$ and $BP_D$, track position signals $U_X$ and $U_Y$ can be obtained from the relations (1) and (2) below:

$$U_X = k(U_A - U_B)/(U_A + U_B) \quad (1)$$
$$U_Y = k(U_C - U_D)/(U_C + U_D) \quad (2)$$

where k: Ratio between read head width $T_W$ and track pitch $T_P$ ($T_W/T_P$).

The track position signals $U_X$ and $U_Y$ vary as a positional function of a radial direction R of the floppy disc at a cycle of $2T_P$ (360°) while they are shifted 90° from each other. The radial position is divided into an area $RA_2$ where $U_Y>0$ in a position near a track at an even address, an area $RA_4$ where $U_Y<0$ in a position near a track at an odd address, an $RA_1$ where $U_X<0$ in a position between track center axes, and an area $RA_3$ where $U_X>0$ in a position between the track center axes.

The track position signal $U_Y$ is linear in the areas $RA_1$ and $RA_3$, and the track position signal $U_X$ is linear in the areas $RA_2$ and $RA_4$. Therefore, when the read head is roughly positioned within a range of $\pm 1$ track from an object track, the track position signals can be used to position the read head at the center of the track with a high accuracy and thus the read head can be finally positioned in all the areas in the radial direction R.

The disc drive according to the present invention is adapted to detect the format information FI recorded in the servo area as previously described, thereby permitting to identify a format even in a floppy disc having no format ID hole in the envelope thereof.

Therefore, the disc drive may not be provided with any detector for detection of an ID hole or the like formed in the envelope encasing a recording medium as in the conventional floppy disc.

Next, the disc drive an method of playing the disc-like recording medium according to the present invention will be described herebelow with reference to FIG. 8.

Figure 8:
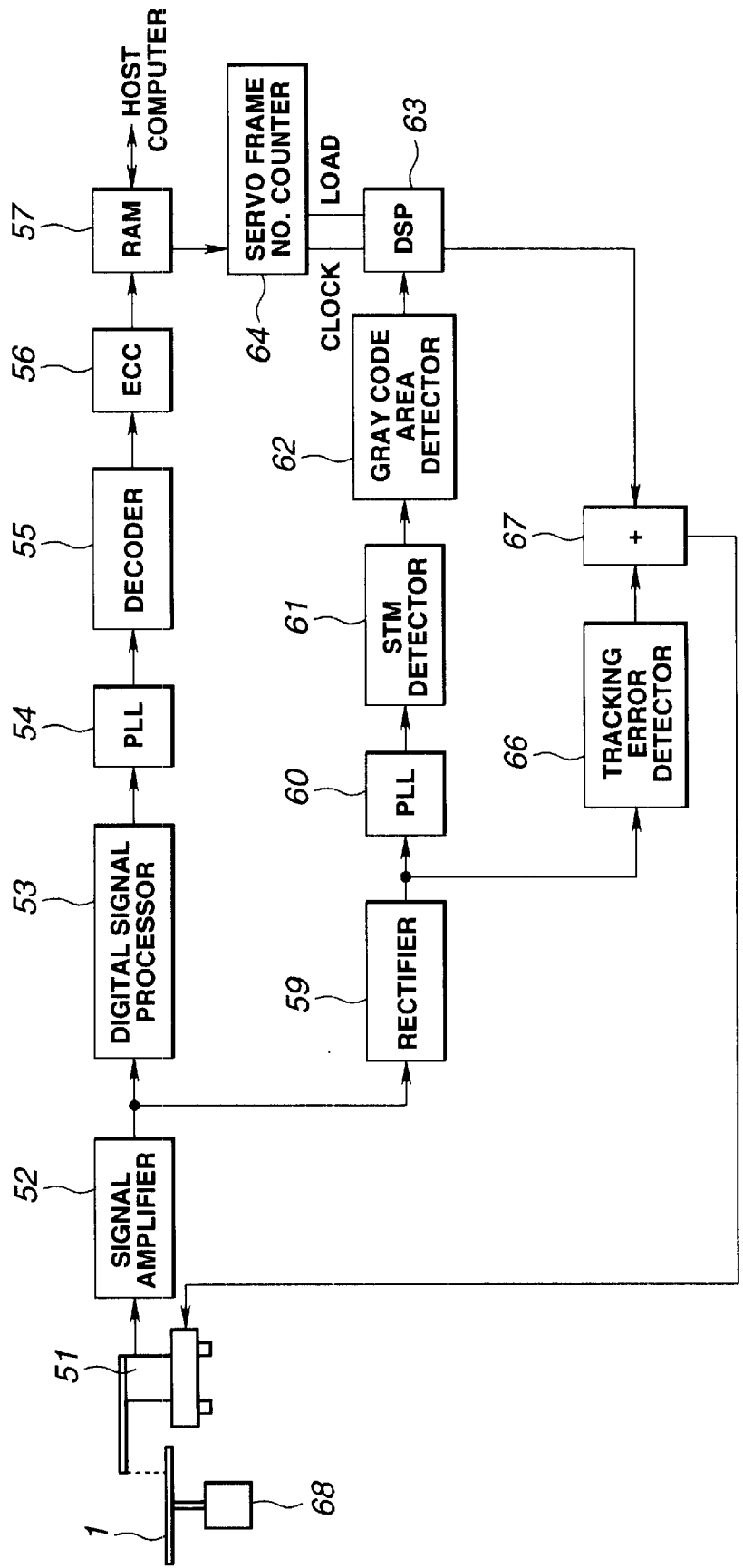
FIG. 8 shows a circuit configuration of an embodiment of the signal reproducing apparatus according to the present invention.

In FIG. 8, the disc drive is generally indicated with a reference 50. It is adapted to play the floppy disc 1 having the format information FI in the servo area $S_A$ in the user data read/write area, as having been described with reference to FIGS. 1 to 7. The disc drive 50 shown in FIG. 8 has at least a read function. This embodiment may of course be applied to a disc drive having both write and read functions.

As seen from FIG. 8, the disc player 50 comprises a read head 51 to read an information signal recorded on the signal recording surface of the floppy disc 1, a signal amplifier circuit 52 to amplify and output the read signal supplied the read head 51, a digital signal processor circuit 53 to digitize the read signal amplified by the signal amplifier circuit 52, a PLL circuit 54 to detect a clock signal from the digital signal supplied from the digital signal processor circuit 53, synchronize and supply it to a circuit provided downstream of the PLL (phase locked loop) circuit 54, a decoder 55 to decode and otherwise process the synchronized digital signal from the PLL circuit 54, an ECC (error correcting code) circuit 56 to correct an error of the decoded digital signal supplied from the decoder 55, and a RAM 57 to store once the output digital signal from the ECC circuit 56. The RAM 57 has connected thereto a host computer to control input/output of a digital signal to/from the RAM 57.

The disc player 50 further comprises a rectifier circuit 59 to rectify the read signal from the signal amplifier circuit 52, another PLL circuit 60 to detect and synchronize a clock signal from the read signal supplied from the rectifier circuit 59, a servo timing mark (STM) detector circuit 61 to detect a servo timing mark contained in the output signal from the PLL circuit 60 and provide a signal synchronized with the servo timing, a gray code area detector circuit 62 to read, gated by the sync signal supplied from the STM detector circuit 61, the information in the gray code area of the disc and the format information FI, a digital signal processor (DSP) circuit 63 to detect and otherwise process the information in the gray code area and the format information FI detected by the gray code area detector circuit 62, a frame number counter 64 to calculate a servo frame number based on the servo frame position information supplied from the DSP circuit 63, a tracking error detector circuit 66 to detect a tracking error based on the signal supplied from the rectifier circuit 59, a mixing circuit 67 to pass to he read head 51 the output signal from the DSP circuit 63, for example, a track seek signal, etc. and a tracking error signal supplied from the tracking error detector circuit 66, and a spindle motor 68 to spin the floppy disc 1.

The gray code area detector circuit 62 and DSP circuit 63 form together a format information detector to detect a format information from the informative data read from the floppy disc 1. The disc player 50 reads the informative data recorded in the floppy disc 1 with a predetermined number of bits.

Next, the detection of the format information by the disc player 50 having the aforementioned configuration will be described with reference to FIG. 9.

Figure 9:
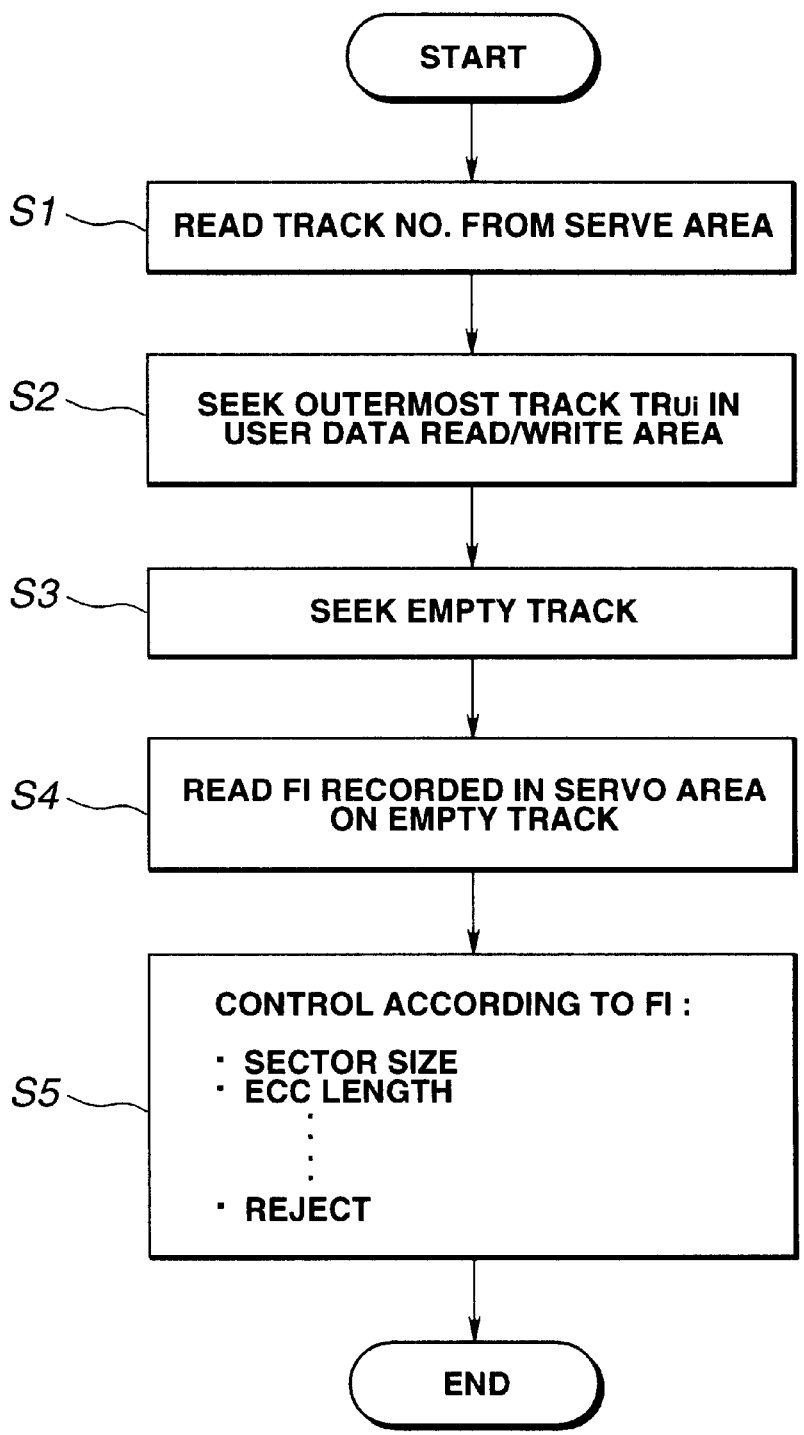
FIG. 9 is a flow chart of operations of the signal reproducing apparatus in FIG. 8 for detecting a format information recorded in the floppy disc.

FIG. 9 is a flow chart prepared for explanation of the detection of the format information FI by the disc player 50. Note that the floppy disc 1 has the format information FI recorded in the servo area $S_A$ on the empty track.

First, the disc player 50 detects, by the gray code area detector circuit 62, the gray code area $G_A$ in the servo area $S_A$, and informs the DSP circuit 63 of the detection of the gray code area $G_A$.

At Step S1, the DSP circuit 63 reads a track number TN in the gray code area $G_A$, detected by the gray code area detector circuit 62. The DSP circuit 63 checks the current position of the read head 51 in the light of the read track number TN, and then controls the read head 51 to seek the outermost track $TR_{Ui}$ in the user data read/write area at Step S2.

Confirming the seek to the outermost track, the DSP circuit 63 allows the read head 51 to seek the empty track located at the outer circumference of the outermost track at Step S3, and detects the format information FI recorded in the servo area $S_A$ at Step S4.

The DSP circuit 63 controls as follows according to the detected format information FI. For example, it adjusts the sector size and ECC length to the format in the information FI, and rejects the medium if the medium carries an unusable format.

As having been described in the foregoing, the disc player 50 can detect a format information FI recorded in the servo area $S_A$ on the empty track. Therefore, the disc player 50 can control even a floppy disc having no cuts or the like for identification of the format, etc. formed in the envelope thereof by identifying the disc format, etc. and detecting the disc version, etc. Thus, the disc player 50 needs no detector to detect the cuts or the like formed in the envelope encasing a recording medium as in the conventional floppy disc.

As having been described in the foregoing, the embodiment of the disc drive according to the present invention can check the disc format without any such extension detector since a format information FI is recorded in the servo area $S_A$ of the disc-like recording medium usable in the disc drive.

Next, a further embodiment of the present invention will be described with reference to FIGS. 10 and 11.

Figure 10:
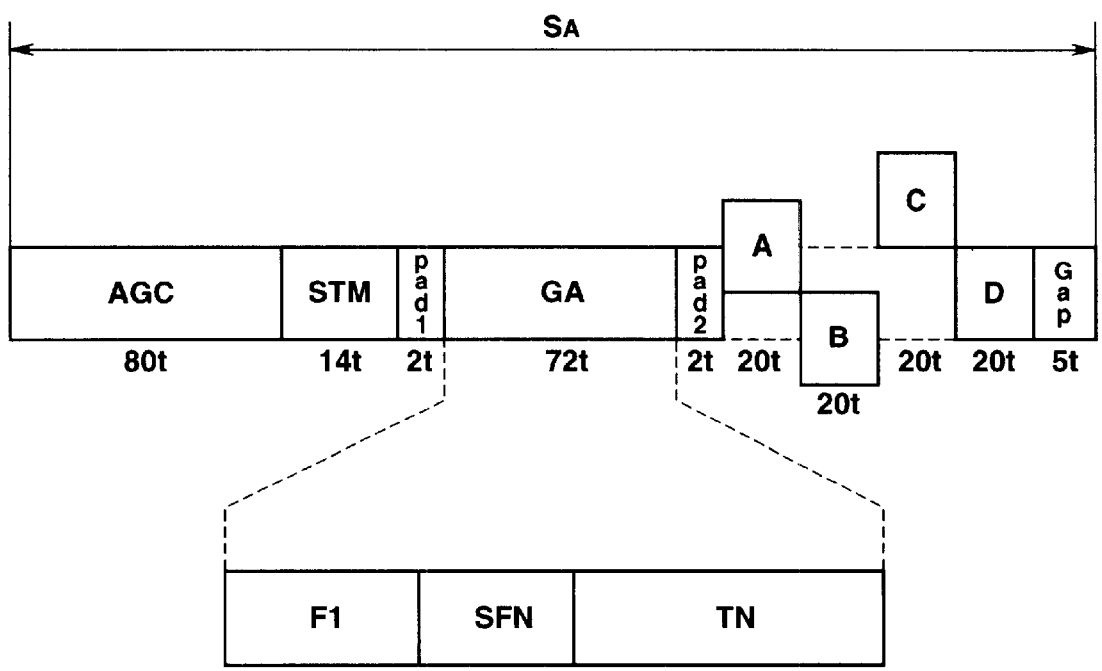
FIG. 10 shows an example of the servo area in which a format information is recorded in the user data read/write area.

FIG. 10 shows an example of the write of a servo frame number SFN, track number TN and a format information FI in the servo area $S_A$ in the user data read/write area $R_{UD}$ on the floppy disc 1. As apparent from comparison with the servo area $S_A$ in FIG. 1, the servo area $S_A$ in FIG. 10 is longer by a servo frame number SFN added to the servo area $S_A$ in FIG. 1.

In many cases of digital signal processing in the disc drive, however, data is handled taking a power of 2 or a multiple of 8 as the unit. For example, the number of bits for the read/write buffer is 16, 24, 32 or the like in many cases. In these situations, both processing of 19-bit data in the servo area and processing of 24-bit may be said to be a same load to the CPU.

Therefore, in case the total length of the gray code area $G_A$ including the format information FI is 24 bits as shown in FIG. 11, read of the format information FI will not add to the load to the CPU, etc. in the disc drive since the format information FI can be read at a time together with the track number TN and servo frame number SFN.

In the example shown in FIG. 11, the first 5 bits of the total of 24 bits in the gray code area $G_A$ are assigned to a format information FI. That is, each bit i of the format information FI is assigned to each of the five MSBs 23 to 19. The structures of the servo frame number SFN and track number TN following the format information FI are same as those having previously been described with reference to FIG. 6, so they will not be further explained.

The format information FI, servo frame number SFN and track number TN recorded in the gray code area $G_A$ are readable even if the format in the data area is modified. Therefore, even if a data recorded in the data area is not recorded in a format allowed by the disc drive, the format information, etc. can be read.

Industrial Applicability

It is appreciable that the present invention is not limited to the modes of the present invention having been described as examples but can be modified in various manners without departure from the claims which will be set forth later. In the aforementioned modes, the format information is recorded in the servo area on the inner- and outer-circumferential empty tracks outside the user data read/write area. However, the format information may be recorded only in one of empty tracks formed only along at least one of the outermost and innermost circumferences of the disc-like recording medium, for example. Also, the disc drive may of course have a write function in addition to the read function. Furthermore, the disc-like recording medium is not limited to a floppy disc or flexible magnetic disc, but the present invention may be applied to a removable hard disc, magneto-optic disc, etc.

What is claimed is:

1. A disc-like recording medium with a plurality of tracks having formed thereon:
   a plurality of servo areas in which servo information is recorded; and
   a plurality of data areas; wherein:
      the servo areas and data areas are disposed alternately in each of the tracks;
      one servo area in each track and a data area following the one servo area form one servo frame; and
      format information defining the disc-like recording medium's internal information recording format is recorded along with the servo information in the servo area, the format information including a specification of a generation standard of the recording medium.

2. The disc-like recording medium as set forth in claim 1, wherein:
   the plurality of tracks includes a plurality of user data tracks and a track empty of data in the data areas formed in at least either of the outermost and innermost tracks of the disc-like recording medium.

3. The disc-like recording medium as set forth in claim 2, wherein:

the servo area on the user data track has recorded therein a servo frame number indicative of the position of a servo frame included in the servo area and a track number indicative of the position of the user data track; and the servo area on the track empty of data in the data areas has recorded therein the format information and a track number indicative of the position of the track empty of data in the data areas.

4. The disc-like recording medium as set forth in claim 3, wherein the format information is recorded in the servo area on the track empty of data in the data areas in a position corresponding to a position where a servo frame number is recorded in the servo area on the user data track.

5. The disc-like recording medium as set forth in claim 3, wherein the track number is recorded as a gray code in the servo area.

6. The disc-like recording medium as set forth in claim 1, wherein the disc-like recording medium is a magnetic disc.

7. The disc-like recording medium as set forth in claim 1, wherein the disc-like recording medium is a flexible magnetic disc.

8. The medium of claim 1, wherein the format information includes:

fields configured to specify modes and sector lengths of data that is recorded on the recording medium.

9. The medium of claim 1, wherein the plurality of tracks includes:

tracks whose data areas are empty of data and in whose servo areas the format information is recorded; and user data tracks in whose data areas user data is stored.

10. The medium of claim 1, wherein the plurality of tracks includes:

user data tracks in whose data areas user data is stored, and in whose servo areas the format information is recorded.

11. A disc drive for driving a disc-like recording medium with a plurality of tracks having formed thereon:

a plurality of servo areas in which servo information is recorded; and a plurality of data areas; wherein:

the servo areas and data areas are disposed alternately in each of the tracks;

one servo area in each track and a data area following the one servo area form one servo frame; and format information defining the disc-like recording medium's internal information recording format is recorded along with the servo information in the servo area, the format information including a specification of a generation standard of the recording medium;

the disc drive comprising:

a head to read information recorded in the disc-like recording medium;

moving means for moving the head radially of the disc-like recording medium;

tracking servo signal generating means for generating a tracking servo signal based on an output of the head; and control means for controlling the head to read the servo information from any one of the servo areas, for controlling the moving means to move the head to a track in which the format information is recorded, and for controlling the head to read the format information.

12. The disc drive as set forth in claim 11, wherein, when the control means controls the head to seek the track in which the format information is recorded, the controlling means controls the head to seek an extreme one of the plurality of user data tracks before allowing the head to seek the track in which the format information is recorded.

13. The disc drive of claim 11, wherein the format information includes:

fields configured to specify modes and sector lengths of data that is recorded on the recording medium.

14. The disc drive of claim 11, wherein the plurality of tracks includes:

tracks whose data areas are empty of data and in whose servo areas the format information is recorded; and user data tracks in whose data areas user data is stored.

15. The disc drive of claim 11, wherein the plurality of tracks includes:

user data tracks in whose data areas user data is stored, and in whose servo areas the format information is recorded.

16. A method of reading a disc-like recording medium with a plurality of tracks having formed thereon:

a plurality of servo areas in which servo information is recorded; and a plurality of data areas; wherein:

the servo areas and data areas are disposed alternately in each of the tracks;

one servo area in each track and a data area following the one servo area form one servo frame; and format information defining the disc-like recording medium's internal information recording format is recorded along with the servo information in the servo area, the format information including a specification of a generation standard of the recording medium;

the method comprising:

reading the servo information from any one of the servo areas;

allowing a head to seek a track in which the format information is recorded, based on the read servo information; and reading the format information.

17. The method of claim 16, wherein the format information includes:

fields configured to specify modes and sector lengths of data that is recorded on the recording medium.

18. The method of claim 16, wherein the plurality of tracks includes:

tracks whose data areas are empty of data and in whose servo areas the format information is recorded; and user data tracks in whose data areas user data is stored.

19. The method as set forth in claim 18, further comprising between the steps of reading the servo information and allowing the head to seek the track in which the format information is recorded, a step of:

allowing the head to seek an extreme one of the plurality of user data tracks.

20. The method of claim 16, wherein the plurality of tracks includes:

user data tracks in whose data areas user data is stored, and in whose servo areas the format information is recorded.

* * * * *

UNITED STATES PATENT AND TRADEMARK OFFICE
CERTIFICATE OF CORRECTION

PATENT NO. : 6,337,779 B1  Page 1 of 1
DATED : January 8, 2002
INVENTOR(S) : Shirane It is certified that error appears in the above-identified patent and that said Letters Patent is hereby corrected as shown below:

<u>Title page,</u>
Item [45], the Date of Patent should read:
-- [45]  Date of Patent:        *Jan. 8, 2002 --
The Notice information should read:
-- [*]    Notice:         This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Fourth Day of June, 2002

*Attest:*

JAMES E. ROGAN
*Attesting Officer*        *Director of the United States Patent and Trademark Office*